United States Patent [19]

Wicklund et al.

[11] 4,277,510

[45] Jul. 7, 1981

[54] PROCESS OF MAKING POTATO CHIPS

[75] Inventors: Peter A. Wicklund; John T. Ivers, both of Lewisville, Tex.

[73] Assignee: Frito-Lay, Inc., Dallas, Tex.

[21] Appl. No.: 127,040

[22] Filed: Mar. 4, 1980

Related U.S. Application Data

[63] Continuation of Ser. No. 114, Jan. 2, 1979, abandoned.

[51] Int. Cl.³ .......................... A23B 7/03; A23L 1/216
[52] U.S. Cl. ...................................... 426/441; 426/438; 426/464; 426/472; 426/473; 426/506; 426/511; 426/637; 426/808
[58] Field of Search ............... 426/637, 438, 441, 455, 426/456, 464, 465, 472, 473, 482, 483, 506, 511, 518, 808

[56] References Cited

U.S. PATENT DOCUMENTS

| | | | |
|---|---|---|---|
| Re. 23,891 | 11/1954 | Chase | 426/637 |
| 1,676,160 | 7/1928 | Ruffner | 426/637 |
| 2,101,506 | 12/1937 | Morrow et al. | 426/441 |
| 3,044,880 | 7/1962 | Bogyo et al. | 426/438 X |
| 3,230,094 | 1/1966 | Hilton | 426/441 X |
| 3,397,993 | 8/1968 | Strong | 426/637 |
| 3,424,591 | 1/1969 | Gold | 426/441 X |
| 3,649,305 | 3/1972 | Wilder | 426/441 X |
| 3,681,084 | 8/1972 | Rock et al. | 426/441 |
| 3,835,222 | 9/1974 | Wisdom et al. | 426/438 X |
| 3,946,116 | 3/1976 | Weaver et al. | 426/637 X |
| 4,084,008 | 4/1978 | Yueh et al. | 426/464 |

Primary Examiner—Arthur L. Corbin
Attorney, Agent, or Firm—Bernard & Brown

[57] ABSTRACT

Potato chips of relatively low oil content are prepared by a process which comprises the steps of forming potatoes into slices having a thickness which is suitable for making potato chips, drying the slices in a mono-layer by exposing both major surfaces of the slices to contact with a gaseous atmosphere under drying conditions whereby the average moisture content of the slices is reduced to about 30 to 65% by weight, contacting the resultant dried potato slices with steam under conditions whereby substantial rehydration of the slices is avoided, and frying the steam-treated potato slices to provide potato chips of relatively low oil content. The potatoes, after peeling, may be treated with hot water or steam to avoid making fried chips with white edges.

9 Claims, No Drawings

PROCESS OF MAKING POTATO CHIPS

This is a continuation of application Ser. No. 000,114, filed Jan. 2, 1979, now abandoned.

This invention relates to the production of potato chips of relatively low oil content. More specifically, this invention relates to a process for producing potato chips having reduced oil content, compared with that of potato chips made in the usual manner. In the process of the invention potato slices are dried under controlled conditions in a mono-layer to reduce the moisture content of the slices prior to steam treating and frying the slices. The potatoes, after peeling, may be treated with hot water or steam to avoid making fried chips with white edges.

Potato chip products presently on the commercial market contain generally in excess of, for instance, about 38% oil. Oil contributes substantially to the calorie content of potato chips and, accordingly, it is desirable to provide a potato chip product having a reduced oil content and a resulting reduced calorie content as well. Also by reducing the oil content of the potato chip product the actual amount of oil required to make the chips is reduced providing a more economical product. Accordingly, the instant invention provides an economical process for producing a good quality potato chip product having reduced oil content, a crunchy texture, and desirable organoleptic properties.

The process of the present invention involves forming potatoes into slices having a thickness suitable for making potato chips and drying the slices in a monolayer by exposing both major surfaces of the slices to contact with a gaseous atmosphere under drying conditions whereby the average moisture content of the slices is reduced to about 30 to 65% by weight. The resultant dried potato slices are contacted with steam under conditions whereby substantial rehydration of the slices is avoided prior to frying the steam-treated potato slices to provide potato chips of relatively low oil content.

The process of the invention can be conducted by slicing essentially uncooked potatoes into slices which are suitable for processing into potato chips. The potatoes, and the resulting slices, generally have a moisture content above about 70 weight %, for instance, in the range of about 75 to 90%. Slicing may be accomplished by means of any of various known apparatus which are available for use in slicing potatoes to be made into potato chips. Typically, whole, raw potatoes may be scrubbed prior to slicing and they may be either peeled or left unpeeled, although unpeeled potatoes are preferred for use in the process because the edges of potato slices formed from unpeeled slices do not tend to become overly dried, which is undesired for reasons discussed herein, when treated pursuant to the process. Generally, individual potato slices having a thickness of from about 0.03 to 0.1 inch have been found to be suitable for making into potato chips according to the process of the invention, although a slice thickness of from about 0.05 to 0.07 inch is preferred.

Where the potatoes are peeled prior to slicing, it is preferred to blanch the potatoes prior to slicing. This can be accomplished by contacting the potatoes with water at a temperature of about 150° F. to 212° F., although immersion in boiling water is preferred, for a short period of time, for instance, about 10 to 180 seconds, preferably about 35 to 90 seconds, or by treating the potatoes with steam. Suitable times for the steam treatment are about 10 to 180 seconds, preferably 10 to 120 seconds, depending upon the temperature of the steam. Blanching of the potatoes prior to slicing results in the formation of a gelatinized shell in the outer periphery of the potatoes, and upon slicing, this shell provides a slow-drying gelatinized ring around the edges of the slices which prevents undesired over-drying of the edges, known as "White-edging." The avoidance of white edges around the dried slices is desired since the white edges tend to remain in the final fried products thereby detracting from their appearance to the consumer. The gelatinized ring should have sufficient width to avoid the appearance of white edges on the slices after subsequent drying. This width may be at least about 1/32 inch in order to prevent or minimize "white-edging", and generally this width need not exceed about ¼ or ⅜ inch. The condition of blanching should be such, however, that a majority of the potato remains in an uncooked state.

After slicing, the potato slices that are formed may be subjected immediately to drying, but preferably the potato slices are washed in water prior to drying. Washing of the potato slices prior to drying improves their handling characteristics during further processing according to the invention. Specifically, washing of the potatoes removes surface starch and diminishes the tendency of the slices to stick together or to stick to machinery. Washing may proceed for a period sufficient to reduce this sticking tendency, for instance, in excess of about 5 seconds, preferably at least about 10 to, say, about 120 seconds or more.

The sliced potatoes, in a preferred embodiment, may be chemically blanched prior to drying. This blanching of the slices may be accomplished by including a chemical blanching agent in the wash water for the slices, in an amount which is effective to chemically blanch and thereby minimize or prevent discoloration of the potato slices. Inclusion of a chemical blanching agent in the wash water will generally not affect the washing time. Alternatively, the slices may be immersed in a separate blanching solution either before or after, but preferably after washing of the potato slices. Where chemical blanching of the slices is accomplished in a separate solution, the slices can be immersed in the aqueous solution containing the blanching agent for a sufficient period of time to effect the desired blanching, generally for a period in excess of about 5 seconds, preferably about 10 to 60 seconds. The preferred chemical blanching agent is sodium bisulfite, and it has been found that an aqueous solution of about 0.05 to 0.5%, preferably about 0.1 to 0.4%, by weight sodium bisulfite is effective to chemically blanch the slices whether the blanching agent is included in the wash water or in a separate blanching solution.

After slicing, and in preferred embodiments after one or both of washing and blanching of the slices, the slices are dried in a mono-layer. As used herein, the term mono-layer refers to an arrangement of the slices wherein a major proportion, and preferably essentially all, of both major surfaces of the slices are exposed to direct contact with a gaseous atmosphere under drying conditions. The gas may be air, and the gas can be relatively quiescent as, for instance, in a radiant oven, but preferably it is in moving contact with the potato slices. During drying the slices are not disposed in overlapping contact with one another to a substantial extent. The slices can be at least slightly separated from each other, and then may be positioned in the same general plane.

In any event, a major portion of both of the largest surfaces of the potato slices are exposed to conditions of desired treatment, i.e. drying conditions. Such drying is accomplished with the gaseous atmosphere in contact with the potato slices being at an elevated temperature. In one embodiment of the invention, drying of the slices can be accomplished by passing a mono-layer of the slices supported on an open surfaced, wire belt in contact with a gentle cross-draft or stream of gas in a drying oven at a desired belt speed and at a temperature sufficiently high to remove the desired amount of moisture. Generally, the potato slices just prior to drying will have a moisture content of at least about 70% by weight, for instance about 75 to 90% by weight. When drying of the slices in a mono-layer pursuant to the invention the moisture content of the slices will be reduced to about 30 to 65% by weight, preferably about 40 to 60% by weight. Thus, generally from about 40 to 95, preferably about 50 to 90%, of the moisture present in the potato slices prior to the drying step is removed during the mono-layer drying procedure.

It has been found that by drying the potato slices in a mono-layer, thereby exposing both major surfaces of the potato slices to gaseous drying contact, drying of the slices is accelerated, and the speed of the belt carrying the potato slices through the dryer may be maintained fairly high. This operation contributes to the provision of slices whose characteristics are such that a lesser amount of oil is absorbed by the slices during frying. During drying, both major surfaces of the slices are desirably exposed to drying conditions for about 3 to 45 minutes, preferably about 5 to 25 minutes, at temperatures of from about 150° F. to 350° F., preferably about 170° F. to 320° F., depending, as will be appreciated by those skilled in the art, upon the equipment used, the quantity of potatoes being sliced in a given time period, the moisture of the drying oven and other variables.

After the potato slices are dried according to the process of the invention, they are steam treated and this avoids undesirable color formation in the chip product. During this steam treatment the slices are under conditions whereby substantial rehydration of the slices is avoided. During this treatment surface starch on the slices is apparently gelatinized. In general the moisture increase, if any, should be less than about 20% by weight, preferably less than about 10%, based upon the total moisture content of the slices just prior to steam treatment. It has been found that this conditioning of the slices for about 15 to 60 seconds, preferably about 20 to 40 seconds, in water vapor generated by, for instance, boiling water therebelow will accomplish the desired treatment of the slices.

After the latter steam treatment, the slices are fried by any suitable means for frying potato chips. Typically the slices are immersed in a cooking oil, e.g. liquid cottonseed oil, for a period of from about 45 to 120 seconds, preferably about 60 to 90 seconds, at a temperature of from about 300° F. to 400° F., preferably 325° F. to 380° F. to fry the slices. The slices are then removed from the fryer, cooled, and, if desired, salt or other flavoring agents may be added. The slices are then ready for packaging by means known in the art.

Potato chips made by the above process typically will have a relatively low average oil content of about 20 to less than about 35% by weight say, up to about 32 or 38%, or only up to about 30%. This result compares very favorably with potato chip products presently on the market made by known techniques which on average have an oil content in excess of about 35% by weight typically about 40% by weight. Thus, the chip products made by the process of the instant invention have a reduced oil content and reduced calorie content as compared to potato chip products presently on the market and the process is more economical since less oil is consumed. At the same time a product is provided which has very desirable flavor and texture characteristics and especially a crunchy texture, which is particularly desirable in products of this type.

The instant invention may be further understood by reference to the following examples which are not to be construed as limiting the scope of the subject matter of the invention.

EXAMPLES 1-4

In Examples 1-4 unpeeled raw potatoes having a moisture content of about 82-87% by weight were scrubbed, sliced to a thickness of 0.062 inch, washed for one minute in 0.2 percent sodium bisulfite solution, and dried in a mono-layer in an oven at 170° to 190° F. for the period of time indicated in Table I to reduce the moisture content of the slices to about 60-65% by weight. The unpeeled, dried slices were steam-treated at 210° F. for 30 seconds, after which the moisture content of the slices rose only slightly to an average of about 65-70% by weight, i.e. about 69.2 percent by weight for example 4. Subsequently the slices were fried in cottonseed oil until boiling of the oil ceased (herein BEP) at a temperature of 340°-360° F. In Examples 1-4 summarized in Table I, the drying time was varied as indicated, and the oil analysis of the resultant chips are provided.

TABLE I

| Example | Drying Time Minutes | % Oil Analysis |
|---------|---------------------|----------------|
| 1       | 19                  | 28.5           |
| 2       | 13                  | 31.5           |
| 3       | 15                  | 27.0           |
| 4*      | 15                  | —              |

*The conditions were the same as for Example 3, except the slices were multi-layered on the oven conveyor and the resultant slices showed wet areas where they were in contact during drying. Because of the presence of wet areas on the surface of the slices they were determined to be unsuitable for frying.

EXAMPLE 5-8

In a continuous pilot plant process, raw, whole, unpeeled potatoes having a moisture content of about 82 to 85% by weight, were scrubbed, sliced to a thickness of 0.062 inch, washed for one minute in 0.2 percent sodium bisulfite solution, and dried in a mono-layer by passing through a forty foot long drying oven on a belt at an average temperature of 185° F. The residence time in the oven was 20 minutes and 45 seconds. After drying the average moisture content of the slices was about 60-65% by weight. A subsequent steam treatment of the dried slices was conducted at 210° F. for the period of time for each Example indicated below in Table II, increasing the moisture content by about 4-6% by weight. Frying time was one minute and 15 seconds, and frying temperatures employed and resulting oil analysis were as indicated in Table II.

TABLE II

| Example | Oven Temperature | Steam-treatment Time (Seconds) | Frying Temperature | Percent Oil |
| --- | --- | --- | --- | --- |
| 5 | 185° F. | 50 | 353° F. | 28.5 |
| 6 | 185° F. | 30 | 353° F. | 28.5 |
| 7 | 180° F. | 30 | 353° F. | 27.0 |
| 8 | 180° F. | 30 | 340° F. | 28.5 |

Results: The chips which were produced in Examples 5–8 showed relatively good appearance and had a crunchy texture. Chips produced at a higher frying temperature than illustrated in Table II of, for instance, 375° F. were more tender, whereas the lower-frying temperature of 340° F. illustrated in Example 8 gave a crunchier and harder texture to the chips.

EXAMPLE 9

Potato slices were immersed in a 0.2 precent solution of sodium bisulfite for 15 seconds and were dried in a mono-layer for 16 minutes at 170°–190° F. In this Example, separate samples of hand-peeled and mechanical-peeled potatoes were sliced and treated with no blanching of the whole peeled potatoes prior to slicing. It was found that both samples exited from the drying oven with white edges indicating a loss of moisture on the edges of the slices. The slices were not processed further due to the presence of the undesired white edges on the dried slices.

EXAMPLE 10–12

The procedure as set forth in Example 9 was followed in Examples 10–12 except that the whole peeled potato was blanched by treatment with steam, in a steam blancher to test the effects of surface gelatinization. In Examples 10–12 summarized below in Table III the conditions of blanching were varied with the results set forth.

TABLE III

| Example | Blanching Conditons Time (min.) | Temperature | Results |
| --- | --- | --- | --- |
| 10 | 2 | 210° F. | ⅛ to ¼ inch ring of gelatinized starch appeared around each skin. No white edges were observed after drying. |
| 11 | 1 | 185° F. | Gelatinization around the slice edges was slightly visible (less than 1/32 inch); white edges were observed after drying. |
| 12 | 1.5 | 185° F. | The ring of gelatinized starch was less than 1/16 of an inch and there were no white edges after drying. |

EXAMPLE 13–18

Whole peeled potatoes were blanched by dipping in water at the temperatures and for the times indicated in Table IV below prior to slicing. Blanching conditions were as indicated below in Table IV.

TABLE IV

| Example | Blanching Conditions Time (sec) | Temperature |
| --- | --- | --- |
| 13 | 5 | 210° F. |
| 14 | 10 | 210° F. |
| 15 | 15 | 210° F. |

Results: It was determined that blanching times of 10 and 15 seconds gave sufficient gelatinization to avoid white edging upon drying the slices.

EXAMPLE 16–18

In Examples 16–18 the same procedure was followed in each instance using Monona potatoes, all from the same lot. Thus, the potatoes were peeled, dipped in boiling water for 45 seconds, sliced to a thickness of 0.55–0.60 inch, washed, dipped in a 0.2 percent sodium bisulfite solution for 15 seconds, dried in a mono-layer at 310°–320° F. for 9 minutes, steam-treated at 210° F. for 30 seconds, and fried in liquid cottonseed oil at 355° F. until BEP, providing potato chip products having an average oil content of about 28–32% by weight. The entire process was done continuously except for the potato dipping, slice-washing and feeding of the slices into the dryer in a mono-layer. The percent $H_2O$ analysis for the potato slices after drying for each Example is provided in Table V below:

TABLE V

| Examples | Percent $H_2O$ Analysis (After drying before steam treatment) |
| --- | --- |
| 16 | 57.5 |
| 17 | 61.2 |
| 18 | 56.7 |
|  | 58.5 (average) |

EXAMPLE 19–26

A procedure was used in Examples 19–26 that was similar to that outlined for Examples 16–18 using Monona potatoes although from a different lot. The potatoes were sliced to a thickness of 0.062–0.065 inch; mono-layer drying was at 310°–320° F. for 9 minutes. A subsequent steam treatment of the slices was conducted at 210° F. for 30 seconds, and frying was at 355° F. until BEP (about 1 to 1.5 minutes). The percent oil in the chip products is set forth below in Table VI.

TABLE VI

| Example | Percent Oil |
| --- | --- |
| 19 | 31.58 |
| 20 | 28.13 |
| 21 | 30.65 |
| 22 | 30.92 |
| 23 | 28.57 |
| 24 | 31.38 |
| 25 | 30.13 |
| 26 | 33.87 |

Comment: The average percent oil analysis for example 19–26 was 30.65.

EXAMPLES 27–36

A continuous pilot plant process was used. Potatoes from a different lot than was used in all the previous Examples were peeled, dipped in water at 210° F. for 45 seconds, sliced to a thickness of 0.60–0.65 inch, washed in clear water, dipped in a 0.2 percent sodium bisulfite solution for 15 seconds, dried in a mono-layer in a 40-foot long oven at 310°–320° F. for 9 minutes, steam-treated at 210° F. for 30 seconds, and fried in liquid cottonseed oil at 355° F. unitl BEP. In Examples 27–36, using the above-described pilot plant process, the oil analyses are as indicated below in Table VII:

TABLE VII

| Example | Percent Oil Analysis |
|---|---|
| 27 | 31.8 |
| 28 | 32.4 |
| 29 | 32.4 |
| 30 | 30.6 |
| 31 | 31.2 |
| 32 | 31.2 |
| 33 | 30.0 |
| 34 | 33.6 |
| 35 | 27.0 |
| 36 | 34.8 |

Comments: The average percent oil content for Examples 30–39 was 31.5. Without including Example 36, which was not used in evaluating the product, the average oil content was 31.1 percent.

EXAMPLE 37–42

The same procedure was used as in Examples 27–36 above except that potatoes from another lot were used. The percent oil analyses in Examples 37–42 using potatoes from this other lot were as set forth below in Table VIII.

TABLE VIII

| Example | Percent Oil Analysis |
|---|---|
| 37 | 30.6 |
| 38 | 31.2 |
| 39 | 24.0 |
| 40 | 27.0 |
| 41 | 27.6 |
| 42 | 26.4 |

Comment: The average percent oil analysis for Examples 37–42 was 27.8

What is claimed is:

1. A process for preparing potato chips of relatively low oil content which comprises peeling potatoes, contacting the potatoes with boiling water or steam to gelatinize surface starch to a width of at least about 1/32 inch on the periphery of said potatoes, forming said potatoes into slices having a moisture content above above 70% by weight and a thickness of about 0.03 to 0.1 inch, drying the slices by exposing the slices to contact with a heated air stream at a temperature of about 170° F. to 320° F. whereby the average moisture content of the slices is reduced to about 30 to 65 percent by weight, contacting the resultant dried potato slices with steam under conditions whereby any moisture content increase is less than about 10 percent based on the total moisture content of the potato slices just prior to steam treatment, and frying the steam-treated potato slices to provide potato chips of relatively low oil content of up to about 30% by weight.

2. A process for preparing potato chips of relatively low oil content which comprises peeling potatoes, contacting the potatoes with boiling water or steam to gelatinize surface starch to a width of at least about 1/32 inch on the periphery of said potatoes, forming said poatatoes into slices having a moisture content above about 70% by weight and a thickness of about 0.03 to 0.1 inch, drying the slices by exposing the slices to contact with a heated air stream at a temperature of about 170° F. to 320° F. whereby the average moisture content of the slices is reduced to about 30 to 65 percent by weight, contacting the resultant dried potato slices with steam under conditions whereby any moisture content increase is less than about 10 percent based on the total moisture content of the potato slices just prior to steam treatment, and frying the steam-treated potato slices to provide potato chips of relatively low oil content.

3. A process according to claim 2, wherein said slices, prior to drying, are contacted with an aqueous washing solution to remove surface starch.

4. A process according to claim 2, wherein said drying is accomplished by exposing the slices to contact with a heated air stream for about 5 to 25 minutes at about 150° F. to 350° F.

5. A process according to claim 4, wherein the temperature of said heated air stream is about 170° F. to 320° F.

6. A process according to claim 2 wherein said steam-treatment of said slices is accomplished under conditions whereby any moisture content increase is less than about 10% based on the total moisture content of the potato slices just prior to steam treatment.

7. A process for preparing potato chips of relatively low oil content which comprises peeling potatoes, contacting the peeled potatoes with steam or boiling water to gelatinize surface starch to a width of at least about 1/32 inch on the periphery of said potatoes, forming the potatoes into slices having a moisture content above about 70% by weight and a thickness of about 0.03 to 0.1 inch, drying the slices in a mono-layer by exposing both major surfaces of the slices to contact with a gaseous atmosphere under drying conditions at elevated temperature whereby the average moisture content of the slices is reduced to about 30 to 65% by weight, contacting the resultant dried potato slices with steam under conditions whereby substantial rehydration of the slices is avoided, and frying the steam-treated potato slices to provide potato chips of relatively low oil content.

8. A process for preparing potato chips of relatively low oil content which comprises peeling potatoes, contacting the peeled potatoes with steam or water at about 150°–212° F. to form a gelatinized shell, in the outer periphery of the potatoes to avoid the appearance of white edges on the potatoes after subsequent slicing and drying, forming the potatoes into slices having a moisture content above about 70% by weight and a thickness of about 0.03 to 0.1 inch, drying the slices in a mono-layer by exposing both major surfaces of the slices to contact with a gaseous atmosphere under drying conditions at elevated temperatures whereby the average moisture content of the slices is reduced to about 30 to 65% by weight, contacting the resultant dried potato slices with steam under conditions whereby substantial rehydration of the slices is avoided, and frying the steam-treated potato slices to provide potato chips of relatively low oil content.

9. A process according to claim 1, 2, 7, 5 or 8 wherein the moisture content of the potato slices before drying is about 75 to 90 percent by weight, and during drying the moisture content of the potato slices is reduced to about 40 to 60 percent by weight.

* * * * *

UNITED STATES PATENT OFFICE
CERTIFICATE OF CORRECTION

Patent No. 4,277,510    Dated July 7, 1981

Inventor(s) Peter A. Wicklund and John T. Ivers

It is certified that error appears in the above-identified patent and that said Letters Patent are hereby corrected as shown below:

Column 3, line 67, delete "38%" and insert --33%--.

Signed and Sealed this

Seventeenth Day of November 1981

[SEAL]

Attest:

GERALD J. MOSSINGHOFF

Attesting Officer    Commissioner of Patents and Trademarks